United States Patent [19]

Epstein et al.

[11] Patent Number: 5,208,301

[45] Date of Patent: May 4, 1993

[54] SULFONATED POLYANILINE COMPOSITIONS, AMMONIUM SALTS THEREOF, PROCESS FOR THEIR PREPARATION AND USES THEREOF

[75] Inventors: Arthur J. Epstein, Bexley; Jiang Yue, Columbus, both of Ohio

[73] Assignee: Ohio State University Research Foundation, Columbus, Ohio

[21] Appl. No.: 529,023

[22] Filed: May 25, 1990

Related U.S. Application Data

[63] Continuation-in-part of Ser. No. 423,902, Oct. 19, 1989, Pat. No. 5,137,991, which is a continuation-in-part of Ser. No. 193,964, May 13, 1988, Pat. No. 5,079,334.

[51] Int. Cl.$^5$ .................... C08F 283/00; C08F 6/00; C08G 73/00; C08G 75/00
[52] U.S. Cl. .................... 525/540; 525/534; 525/535; 528/210; 528/214; 528/373; 528/391; 528/422; 528/480
[58] Field of Search .................... 525/540, 534, 535; 528/210, 214, 373, 391, 422, 480, 491

[56] References Cited

U.S. PATENT DOCUMENTS

| | | | |
|---|---|---|---|
| 3,941,810 | 3/1976 | Koebner | 549/66 |
| 4,488,943 | 12/1984 | Skotheim | 204/58.5 |
| 4,556,623 | 12/1985 | Tamura et al. | 430/83 |
| 4,585,581 | 4/1986 | Skotheim | 252/518 |
| 4,586,792 | 5/1986 | Yang et al. | 350/357 |
| 4,604,427 | 8/1986 | Roberts et al. | 525/185 |
| 4,615,829 | 10/1986 | Tamura et al. | 252/500 |
| 4,636,430 | 1/1987 | Moehwald | 428/304.4 |
| 4,742,867 | 5/1988 | Walsh | 137/514 |
| 4,749,260 | 6/1988 | Yang et al. | 350/357 |
| 4,822,638 | 4/1989 | Yaniger | 427/79 |
| 4,851,487 | 7/1989 | Yaniger et al. | 528/332 |
| 4,855,361 | 8/1989 | Yaniger | 525/436 |
| 4,935,164 | 6/1990 | Wessling et al. | 252/500 |
| 4,973,391 | 11/1990 | Madou et al. | 204/78 |

FOREIGN PATENT DOCUMENTS 61-197633 9/1986 Japan .

OTHER PUBLICATIONS

Paul, et al., J. Phys. Chem. 89:1441–1447 (1985).
Stafstrom et al., Phys. Rev. Lett. 59:1464 (1987).
Rice et al., Phys. Rev. Lett., 49:1455 (1982).
Bredas et al., Phys. Rev., B29:6761 (1984).
Chiang et al., Synth. Met. 13:193 (1986).
Ginder et al., Solid State Commun., 63:97 (1987).
Epstein et al., Synth. Met., 18:303 (1987).
Choi et al., Phys. Rev. Met., 59:2188 (1987).
Skotheim et al., Electrochem. Soc., 132:246 (1985).
Obayashi et al., Adv. Chem. Ser., 163;316 (1977).
Sammels et al., J. Electrochem. Soc., 131:167 (1984).
Chao et al., J. Am. Chem. Soc., 109:6627 (1987).
Hardy et al., J. Am. Chem. Soc., 1071:3823 (1985).
Gregory et al., Synthetic Metals, 28:C823–C835 (1989).
Nakajima et al., Synthetic Metals, 28:C629–C638 (1989).
Mizumoto et al., Synthetic Metals, 28:C639–C646 (1989).
Angelopoulos et al., J. Vac. Sci. Technol. B7 (6) Nov./-Dec. 1989.
Lacroix et al., J. Electrochem. Soc., 136:1308–1313 (1989).
Computer search performed in the 1989 Am. Chem. Soc., (1989).
Chem. Abstracts, 106:33982g (1987).
Noshay et al., J. App. Polymer Sci., 20:1885–1903 (1976).

*Primary Examiner*—John Kight, III
*Assistant Examiner*—P. Hampton-Hightower
*Attorney, Agent, or Firm*—Emch, Schaffer, Schaub & Porcello Co.

[57] ABSTRACT

Sulfonic acid-substituted polyaniline compositions, ammonium salts thereof, and uses therefor are disclosed. The ammonium salts of the sulfonic acid-substituted polyaniline compositions are used as interim materials in the processing of conducting sulfonated polyaniline compositions. The ammonium salts of the sulfonic acid-substituted polyaniline compositions are also used to either reversible or irreversible $NH_3$ filters, sensors, temperature indicators and the like.

3 Claims, 5 Drawing Sheets

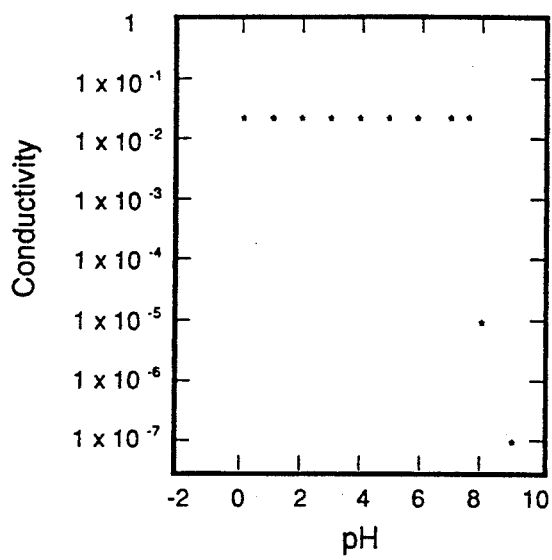
FIG. 7
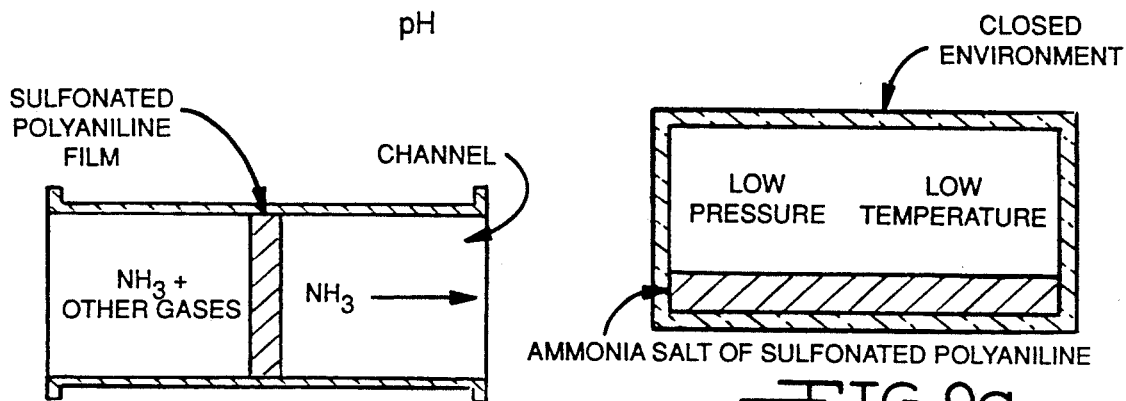
FIG. 8
FIG. 9a
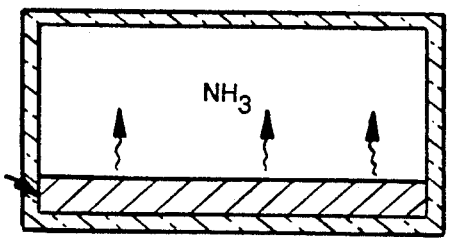
FIG. 9b
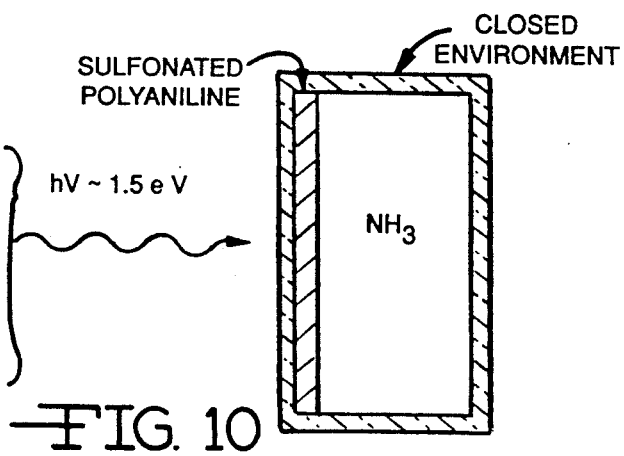
FIG. 10

SULFONATED POLYANILINE COMPOSITIONS, AMMONIUM SALTS THEREOF, PROCESS FOR THEIR PREPARATION AND USES THEREOF

The present invention is a continuation-in-part of co-pending application Ser. No. 07/423,902, filed Oct. 19, 1989 now U.S. Pat. No. 5,137,991 which is a continuation-in-part of co-pending application Ser. No. 193,964 filed May 13, 1988 now U.S. Pat. No. 5,079,334.

BACKGROUND OF THE INVENTION

The present invention relates to self-protonated sulfonic acid-substituted polyaniline compositions, ammonium salts thereof, their derivatives, processes for their preparation, and uses thereof.

Polyaniline is a family of polymers that has been under intensive study recently because the electronic and optical properties of the polymers can be modified through variations of either the number of protons, the number of electrons, or both. The polyaniline polymer can occur in several general forms including the so-called reduced form (leucoemeraldine base), possessing the general formula

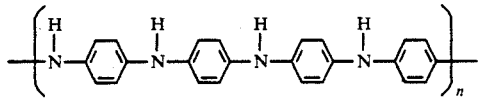

the partially oxidized so-called emeraldine base form, of the general formula

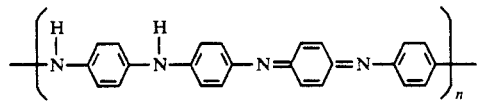

and the fully oxidized so-called pernigraniline form, of the general formula

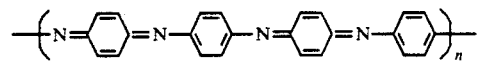

In practice, polyaniline generally exists as a mixture of the several forms with a general formula (I) of

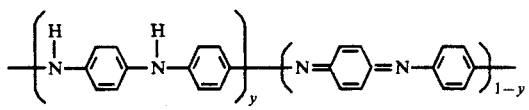

When $0 \leq y \leq 1$, the polyaniline polymers are referred to as poly(paraphenyleneamineimines) in which the oxidation state of the polymer continuously increases with decreasing value of y. The fully reduced poly(paraphenyleneamine) is referred to as leucoemeraldine, having the repeating units indicated above corresponding to a value of y=1. The fully oxidized poly(paraphenyleneimine) is referred to as pernigraniline, of repeat unit shown above corresponds to a value of y=0. The partly oxidized poly(paraphenyleneamineimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, $M^+$. For example, "50%" protonation of emeraldine leads formally to a composition of the formula

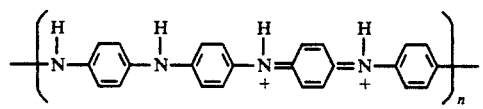

which may be rewritten as

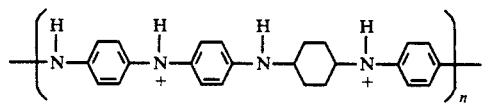

Formally, the degree of protonation may vary from a ratio of $[H^+]/[-N=]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{12}$; deprotonation occurs reversibly in aqueous base or upon exposure to vapor of, for example, ammonia. The emeraldine salt form can also be achieved by electrochemical oxidation of the leucoemeraldine base polymer or electrochemical reduction of the pernigraniline base polymer in the presence of an electrolyte of the appropriate pH. The rate of the electrochemical reversibility is very rapid; solid polyaniline can be switched between conducting, protonated and nonconducting states at a rate of approximately $10^5$ Hz for electrolytes in solution and even faster with solid electrolytes. (E. Paul, et al., J. Phys. Chem. 1985, 89, 1441-1447). The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, in contrast to, other polymeric materials for example, polypyrrole, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

The conductivity of polyaniline is known to span 12 orders of magnitude and to be sensitive to pH and other chemical parameters. It is well-known that the resistance of films of both the emeraldine base and 50% protonated emeraldine hydrochloride polymer decrease by a factor of approximately 3 to 4 when exposed to water vapor. The resistance increases only very slowly on removing the water vapor under dynamic vacuum. The polyaniline polymer exhibits conductivities of approximately 1 to 20 Siemens per centimeter (S/cm) when approximately half of its nitrogen atoms are protonated. Electrically conductive polyaniline salts, such as fully protonated emeraldine salt $[(-C_6H_4-NH-C_6H_4-NH^+)-Cl^-]_x$, have high conductivity ($10^{-4}$ to $10^{+2}$ S/cm) and high dielectric constants (20 to 200) and have a dielectric loss tangent of from below $10^{-3}$ to approximately $10^1$. Dielectric loss values are obtained in the prior art by, for example, carbon filled polymers, but these losses are not as large nor as readily controlled as those observed for polyaniline.

The present invention is related to the invention disclosed in the parent co-pending application Ser. No. 07/423,902 filed Oct. 19, 1989 now U.S. Pat. No. 5,137,991 which is a continuation-in-part application of Ser. No. 193,694 filed May 13, 1988 now U.S. Pat. No. 5,079,334 which are expressly incorporated herein by reference. The Ser. No. 07/423,902 filed Oct. 18, 1989, U.S. Pat. No. 5,137,991 application discloses self-protonated sulfonic acid-substituted polyaniline compositions, their derivatives, processes for their preparation and various uses thereof.

The present invention also relates to the co-pending patent application Ser. No. 07/426,959 filed Oct. 24, 1989 now U.S. Pat. No. 5,164,465 which is expressly incorporated herein by reference. The application Ser. No. 07/426,959 filed Oct. 24, 1989, now U.S. Pat. No. 5,164,465 is a continuation-in-part of the Ser. No. 07/423,902 filed Oct. 19, 1989, now U.S. Pat. No. 5,137,991 and discloses non-protonated sulfonated polyaniline salt compositions which are electrically insulating polymers and which readily dissolve in aqueous solutions.

While the preparation of polyaniline polymers and the protonated derivatives thereof is known in the art, it is novel to prepare sulfonated polyaniline compositions which are capable of being "self-protonated" or "self-doped". The use of the terms "self-protonated" and "self-doped" herein includes, but is not limited to, the reorganizaton of hydrogen ions on the polymer i.e., the absence of any counterion not covalently bonded to the polymer chain. For example, self-doping or self-protonation of a polyaniline base polymer leads to a polyaniline salt polymer and a reorganization of the electronic structure which then forms a polaronic metal. The conductivity of such polaronic metal is independent of external protonation.

However, there is a need for facile methods for processing and using the sulfonated polyaniline compositions and ammonium salts thereof. Such methods will aid in the commercial development of useful conducting sulfonated polyaniline compositions and their derivatives.

SUMMARY OF THE INVENTION

The self-protonated sulfonic acid-substituted polyaniline composition is capable of protonating or doping itself to form an electrically conducting polymer. The sulfonated polyaniline polymer has faster electronic, electrochemical, chemical, and optical responses and improved solubility than the parent polymer, polyaniline. The solubility of the sulfonated polyaniline polymer is increased greatly due to the presence of the sulfonic group $SO_3H$. The sulfonated polyaniline polymer is easy to dissolve in basic aqueous solutions in which the polyaniline polymer is insoluble. In addition, due to the electron withdrawing effects of the $SO_3H$ group, the sulfonated polyaniline polymer has improved environmental stability over the polyaniline polymer. The process for producing the sulfonated polyaniline comprises reacting the polyaniline polymer with concentrated sulfuric acid.

The sulfonated polyaniline compositions and their derivatives are useful in a variety of electronic, electrochemical, chemical, and optical applications. The electrical and optical properties of sulfonated polyaniline compositions can be modified by chemical or electrochemical means. Further, electronic and microelectronic devices based on the chemical and physical properties of sulfonated polyaniline compositions and their derivatives and the control of those properties can be used in many applications.

The present invention relates to methods for processing the and using sulfonated polyaniline polymers in order to make useful forms of the polymer. According to one aspect of the present invention, the sulfonated polyaniline polymer is dissolved in $NH_4OH$ to form a an ammonium salt-sulfonated polyaniline solution. The solution is then applied to a substrate or any object to be cast or coated with the sulfonated polyaniline polymer. Upon the removal of water and ammonia, the conducting form of the self-protonated sulfonated polyaniline polymer is formed.

The speed and reversibility of the electrochemical response of the sulfonated polyaniline compositions and the ammonium salts thereof allows such compositions to be especially useful in such applications as for example, ammonia filters, temperature indicators, active electronic devices such as temperature controlled optical or conductivity switches, chemical sensors, and optical memory devices.

BRIEF DESCRIPTION OF THE DRAWINGS

FIG. 7 is a graph showing the self doped sulfonated polyaniline, without external doping, has a conductivity of 0.1 s/cm depending on the pH.

FIG. 8 shows the insulating ammonium salt form of the sulfonated polyaniline film as NH3 filters.

FIG. 9a and 9b shows a closed, light transmissive temperature sensitive environment comprised of glass, quartz or plexiglass that contains the insulating ammonium salt of the sulfonated polymer, NH4+SPAN.

FIG. 10 shows a window of conductivity which shows the temperature changes from high to low.

DETAILED DESCRIPTION OF THE INVENTION

Figure 1:
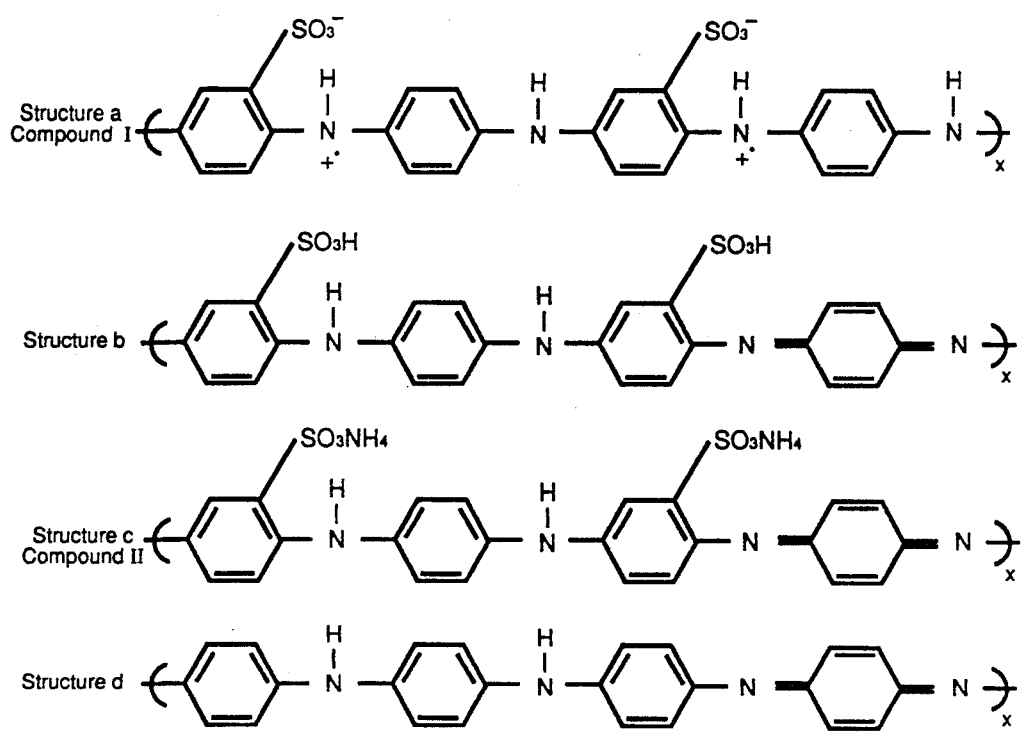
FIG. 1 is a schematic illustration of the different structures of sulfonated polyaniline (a and b), the ammonia salt (c), and the emeraldine base (d).

The present invention relates to sulfonic acid substituted polyaniline compositions, their derivatives, processes for their preparation and uses thereof.

The self-protonated sulfonated polyaniline compositions have the formula I

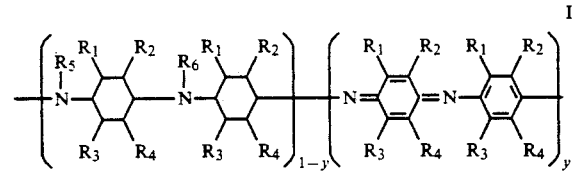

wherein $0 \leq y \leq 1$; $R_1$, $R_2$, $R_3$, $R_4$, $R_5$ and $R_6$ are independently selected from the group consisting of H, $-SO_3M$, $-R_7SO_3M$, $-OCH_3$, $-CH_3$, $-C_2H_5$, $-F$, $-Cl$, $-Br$, $-I$, $-NR_{7\ 2}$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1$-$C_8$ alkyl, aryl or aralkyl group wherein M is an unsubstituted or substituted ammonia of the formula $NA_1A_2A_3$ and $A_1$, $A_2$ and $A_3$ are independently selected from the group consisting of H and $C_1$-$C_8$ straight or branched alkyl. For the sake of clarity, the structure shown in formula I is in the non self-protonated form.

The fraction of rings containing at least one $R_1$, $R_2$, $R_3$ or $R_4$ groups being an $-SO_3M$, or $-R_7SO_3M$ can be varied from a few percent to one hundred percent. In certain embodiments the percentage ranges from at least approximately 20% up to and including 100%. It is within the contemplated scope of the present invention that the $SO_3M$ and $-R_7SO_3M$ substituents can be varied so that the sulfonated polyaniline is soluble in a range of solvents in order to make the sulfonated polyaniline polymer more easily blendable with other polymers and/or more easily cast onto a variety of surfaces.

The solubility of sulfonated polyaniline can be varied by changing the degree of sulfonation (i.e., the sulfonation time and/or temperature in $H_2SO_4(SO_3)$ or time of exposure to $SO_3$, or other sulfonation agents). It is noted that the oxidation state of the polymer (from leucoemeraldine through emeraldine to pernigraniline) and the degree of sulfonation (x) can be independently varied. Here x is the fraction of $C_6$ rings which have an $SO_3-$ or $SO_3H$ group attached.

When x=0, the polymer does not dissolve in either basic or acidic aqueous solutions. Upon increasing the value of x, the polymer becomes soluble in strongly basic, basic, weakly basic and eventually in acidic aqueous solutions. This progressive improvement in solubility implies that the polymer becomes soluble in neutral media, particularly $H_2O$, at the appropriate value of x, yielding a water-soluble conducting polymer. The color of soluble sulfonated polyaniline in acidic solution is green, indicating it is the conducting salt form.

The solubility of polyaniline is increased greatly in basic aqueous solution by the presence of $-SO_3H$ group on the phenyl rings. This is in contrast with polyaniline which, when washed with basic solutions, converts to the insoluble base form.

Protonation of the emeraldine base polymer leads to the emeraldine salt polymer and a reorganization of the electronic structure to form a polaronic metal. Since benzenesulfonic acid is a strong acid, about as strong as hydrochloric acid, the sulfonated polyaniline is capable of self-doping. Hence, the conductivity of the sulfonated polyaniline is independent of external protonation.

Being able to dope itself, the sulfonated polyaniline polymer has enhanced optical and electrical response to electrochemical potential as compared with the parent polyaniline polymer. Since the solid-state diffusion of counterions in and out of a polymer during electrochemical processes is often the rate controlling step in the kinetics, it also limits the speed of both optical and electrical response of polymers. In the self-doped conjugated polymer of the present invention, the counterions are not necessary from the medium. The positive charge introduced into the conjugated pi electron system of the backbone of the polymer is compensated by the protons migrating out of the polymer, or vice versa, leaving behind the opposite charged counterion. Being the smallest and most mobile ion, proton hopping mechanisms lead to relatively fast doping kinetics as compared to those counterions migrating in or out of the polymer. As a consequence, it is possible to achieve sufficient speed to be useful for a variety of technological applications.

The sulfonated polyaniline polymers of the present invention provide opportunities to use the phenomena of the dependence of electrical and optical properties on the backbone chain conformation and on the substituent as well as chain properties which change the chemical properties of polyaniline in a number of useful applications. The side groups on polyaniline also can affect the charge transport in polyaniline. Theoretical studies of polyaniline indicate that the bandgap and bandwidth are affected by the torsion angle (dihedral angle) between adjacent rings on the polymer chain. The torsion angle influences the electronic properties of many conducting polymers with aromatic backbones. For example, poly(o-toluidine) has been studied and the results show that the reduction in pi conjugation of the alkyl derivatives of polyaniline is caused primarily by steric effect.

Without external doping, the sulfonated polyaniline has a conductivity of 0.1 S/cm depending on the pH, as can be seen in FIG. 7, which makes the sulfonated polyaniline a self-doped conducting polymer. The results indicate that the amount of charge injected into or ejected out of the sulfonated polyaniline polymer is quite similar to that of polyaniline. Charge transfer doping within a specific potential range in solutions such as 1.0M HCl and 0.5M $H_2SO_4$ is highly reversible in the air reflecting the environmental stability introduced by the sulfonic acid groups. The inventors present the dependence of positions of redox peaks on different pH values and compare the results with those of sulfonated polyaniline. In contrast with polyaniline, the first redox process depends on pH in the value range of $-0.2$ to about 7 due to the sulfonic acid protons on the sulfonated polyaniline backbones. The second redox process depends on the pH in a manner similar to that of polyaniline.

The chemical synthesis of the sulfonated polyaniline polymers of the present invention is accomplished by reacting polyaniline with concentrated or fuming sulfuric acid, $SO_3$ gas, or other sulfonation agents. Examples of several of the methods for such synthesis are disclosed below.

Materials—Aniline and other chemicals were obtained from Aldrich and were all reagent grade or better. Hydrochloric acid and ammonium hydroxide were used as received. Different pH buffer solutions were commercially purchased.

Chemical Synthesis I: Emeraldine hydrochloride powder was synthesized from aniline and $(NH_4)S_2O_8$ then converted to analytically pure emeraldine base polyaniline using the method described previously in A. G. MacDiarmid, J. C. Chiang, A. F. Richter, N. L. D. Somasiri and A. J. Epstein in L. Alcacer (ed.) *Conducting Polymers*, D. Reidel Publishing Co., Dordrecht, The Netherlands (1987).

For the sulfonation of polyaniline, 1.5 g polyaniline (dry emeraldine base form) was dissolved into 40 ml fuming sulfuric acid $H_2SO_4(SO_3)$ with constant stirring at room temperature. During the sulfonation period the color of the solution changed from dark purple to dark blue. After approximately 2 hours, the solution was slowly added during about 20 minutes to 200 ml methanol while maintaining the temperature between about $10°-20°$ C. by an ice bath. A green powder precipitate was formed during the mixing. After the mixing, 100 ml of less polar acetone was added to the solution in order to increase the precipitate. The green powder was then collected on a Buchner funnel using a water aspirator. The precipitate cake was washed portionwise (50 ml/portion) with methanol until the portion of the filtrate showed pH=7 when tested by wet pH paper. The liquid level in the Buchner funnel was constantly adjusted so that it remained above the top of the precipitate. This prevented cracking of the precipitate cake, which would result in inefficient washing of the precipitate cake.

After the above washing, the precipitate remained under suction for approximately 10 minutes. It was then transferred on the filter paper to a vacuum desicator and dried under dynamic vacuum for 24 hours. Elemental analyses, as shown in Table I are consistent with the composition shown in FIG. 1 as structure a, compound I, which is sulfonated, protonated polyaniline in the emeraldine oxidative state. The self-doped polyaniline is readily dissolved in a dilute aqueous base solution to form a homogeneous blue-violet solution. The solubility of compound I (FIG. 1) in 0.1M $NH_4OH$ and NaOH is $\sim 23$ mg/ml.

Chemical Synthesis II: 1.5 g polyaniline (dry emeraldine base form) was dissolved into 40 ml concentrated sulfuric acid $H_2SO_4$, and the temperature slowly raised from the room temperature to $70°$ C. in water bath in 3 hour period with the constant stirring. The temperature was kept at $70°$ C. for 15 hours. Then the temperature was raised to $95°$ C. within 0.5 hour and kept there for 4 hours. The reaction mixture was cooled down to room temperature. The product was very slowly added to $-38°$ C. ice made from 160 ml distilled $H_2O$ in order to precipitate the polymer. The temperature of the solution was not allowed to reach higher than $0°$ C. during the process. After the temperature of the solution reached room temperature the solution was filtered to obtain a fine powder of sulfonated polyaniline. Large particles were obtained by subsequently heating the room temperature solution up to $70°$ C. in a two hour period, then cooling to room temperature, and conducting filtration to separate the sulfonated polyaniline from the solution. The sulfonated polyaniline was washed with an excess of $H_2O$ until the filtrate was neutral (as tested by pH paper). Dry sulfonated polyaniline was obtained by pumping under dynamic vacuum at room temperature for 48 hours.

Chemical Synthesis III: From the Chemical Synthesis II described above a copolymer (i.e., the polymer mixture of polyanilines and sulfonated polyaniline) was obtained by partially sulfonating polyaniline. This was done in exactly the same way described in the Chemical Synthesis II except utilizing shorter sulfonation times and/or lower sulfonation temperature or using $SO_3$ gas or other sulfonation agents.

Chemical Synthesis IV: Another way to prepare the copolymer polyaniline-sulfonated polyaniline was to react 2-aminobenzene-sulfonic acid (2 ASA) with oxidizing agent in the presence of aniline. 10 g (0.58 mol) 2 ASA and 2 ml (0.02 mol) aniline were dissolved in 500 ml 1M HCl. A prepared solution of 6.609 g (0.029 mol) $(NH_4)_2S_2O_8$ in 200 ml 1H HCl was added dropwise to the monomer solution with vigorous stirring during a period of 10 minutes. After 1.5 hours, the precipitate was collected on a Buchner funnel. The precipitate was washed with 1M HCl until the filtrate was colorless. Then the precipitate was washed by 500 ml $H_2O$. To ensure that the copolymer was in its neutral form, the precipitate was then transferred into a beaker containing 500 ml of $H_2O$ and stirred at room temperature for 4 hours. The mixture was filtered until the pH of the filtrate was 7. The dry copolymer was obtained by pumping under dynamic vacuum at room temperature for 48 hours.

Chemical Synthesis V: The sulfonated polyaniline compositions can be synthesized by exposing polyaniline to $SO_3$ gas, as is fully disclosed in co-pending application Ser. No. 07/529,012 filed May 25, 1990, now U.S. Pat. No. 5,093,439, entitled Processes for Preparation of Sulfonated Polyaniline Compositions and Uses Thereof, filed concurrently herewith, which is expressly incorporated herein by reference.

The chemical synthesis of ammonium salts of sulfonated polyaniline (SPAN) can be accomplished by reacting sulfonated polyaniline with an unsubstituted or substituted ammonium base to form an ammonium salt wherein the backbone polymer is in the insulating emeraldine base form. For example, a sulfonated polyaniline can be reacted with ammonium hydroxide solution of $NH_3$ gas to form $NH_4^+SPAN^-$ salt. In addition, unsubstituted or substituted ammonium bases having the general formula of $NA_1A_2A_3$, wherein $A_1$, $A_2$ and $A_3$ are independently selected from H or a straight or branched $C_1$-$C_8$ alkyl group, can be utilized to achieve the synthesis of ammonium salts of sulfonated polyaniline. Examples of especially useful substituted ammonia include methylamine and dimethylamine. The volatility of the ammonium base is dependent upon the $A_1$, $A_2$, or $A_3$ substituents on the unsubstituted or substituted ammonium bases. The different volatilities of the unsubstituted or substituted ammonium bases provide the opportunity to synthesize an ammonium salt of sulfonated polyaniline having desired optimum temperature and electrochemical responses. The speed and reversibility of the electrochemical response of the composition as it switches from the self-doped sulfonated polyaniline composition to the insulating ammonium salt thereof allows such compositions to be especially useful in a variety of commercial applications. The ability of the unsubstituted or substituted ammonia to reversibly evolve off and on the sulfonated polyaniline composition at a desired predetermined temperature, light absorbancy or capacitance allows the ammonium salt of the sulfonated polyaniline to be incorporated into a wide variety of devices. Such applications or devices take advantage of the two major changes which occur during the transformation of the sulfonated polyaniline composition to the ammonium salt thereof, namely the change in the optical spectra and the change in the conductivity between the sulfonated polyaniline composition and the ammonium salt thereof.

Elemental analyses, infrared and electronic spectroscopy, conductivity and cyclic voltammetry studies are consistent with the sulfonation of emeraldine base with fuming sulfuric acid proceeding to give a self-doped, sulfonated, protonated forms of the emeraldine oxidative state of polyaniline, the compound I (structure a in FIG. 1) which has a conductivity of about 0.1 S/cm. This polymer can be regarded as being formed by the hypothetically initial formation of the strong acid, shown as structure b in FIG. 1, which then immediately protonates the imine nitrogen atoms to give the conducting polymer in an entirely analogous manner to strong acids such as HCl. Treatment of the structure b compound with an aqueous (ammonium) base yields the sulfonated, non-protonated insulating ammonium salt forms analogous to emeraldine base, viz, the structure c, compound II, shown in FIG. 1.

Figure 2:
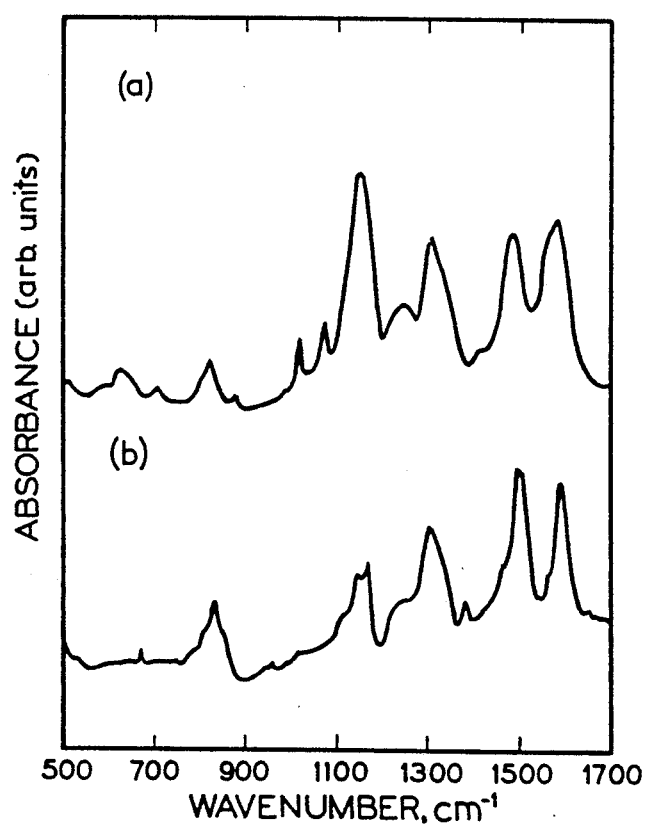
FIG. 2 is a graph illustrating the FTIR spectra of (a) self-doped sulfonated polyaniline; (b) emeraldine base, the parent polymer of sulfonated polyaniline in wave numbers $cm^{-1}$.

Infrared spectra were obtained by mixing the compound I (structure in FIG. 1) into KBr matrix, pressing into pellets and recording on an FTIR spectrometer. For taking electronic spectra the compound I was dissolved in 0.1M $NH_4OH$ to form a homogeneous solution, the polymer solution was then cast on a quartz substrate. Slow evaporation of the aqueous solution of the compound II (structure c) (ammonium salt) in air at room temperature resulted in spontaneous removal of the weak volatile base, $NH_3$ with reformation of the compound I. For example, sulfonation occurs preferentially in alternating rings and that under the present experimental conditions given in the chemical synthesis only half the rings were sulfonated. This is consistent with the increased stability of the semiquinone form. Further sulfonation and consequently double protonation of nitrogen atoms convert some of the —(NH)-to-($NH_2^+$)— and hence reduce the conjugation of the polymer. The FTIR spectrum shown in FIG. 2 of the self-doped polyaniline, the compound I, is consistent with the presence of —$SO_3^-$ groups alternated to the aromatic rings. IR shows absorption maxima of out of plane bending of aromatic hydrogens at 820 and 870 $cm^{-1}$ are indicative of 1, 2, 4 trisubstitutents on the rings. The absorptions are not present in the 1, 2 disubstituted emeraldine base from which the compound I was synthesized. Absorption peaks at 1080, 700 and 590 $cm^{-1}$ are consistent with the presence of $SO_3^-$ groups.

The conductivity of the compound I ($\sigma \sim 0.1$ S/cm) is similar to that of emeraldine hydrochloride measured under the same experimental conditions ($\sigma \sim 1$-5 S/cm; laboratory air), but lower than that $\sigma \sim 18$ S/cm of high molecular weight emeraldine hydrochloride. The self-doped sulfonated polyaniline with emeraldine oxidative state differs dramatically from nonexternally doped polyaniline in conductivity. Since sulfonic acid is a strong acid, approximately as strong as hydrochloric acid, the compound I is capable of doping itself. Pressed pellets of the dark green self-doped compound I had a room temperature conductivity of about 0.1 S/cm in contrast to the purple color and insulating behavior of polyaniline emeraldine base form. However, the conductivity of compound I is lower than that of emeraldine hydrochloride pressed pellets; analogy with earlier study of poly(o-toluidine), the lower conductivity is in accord with increased conduction electron localization induced by the side chain effects of —$SO_3^-$.

Figure 3:
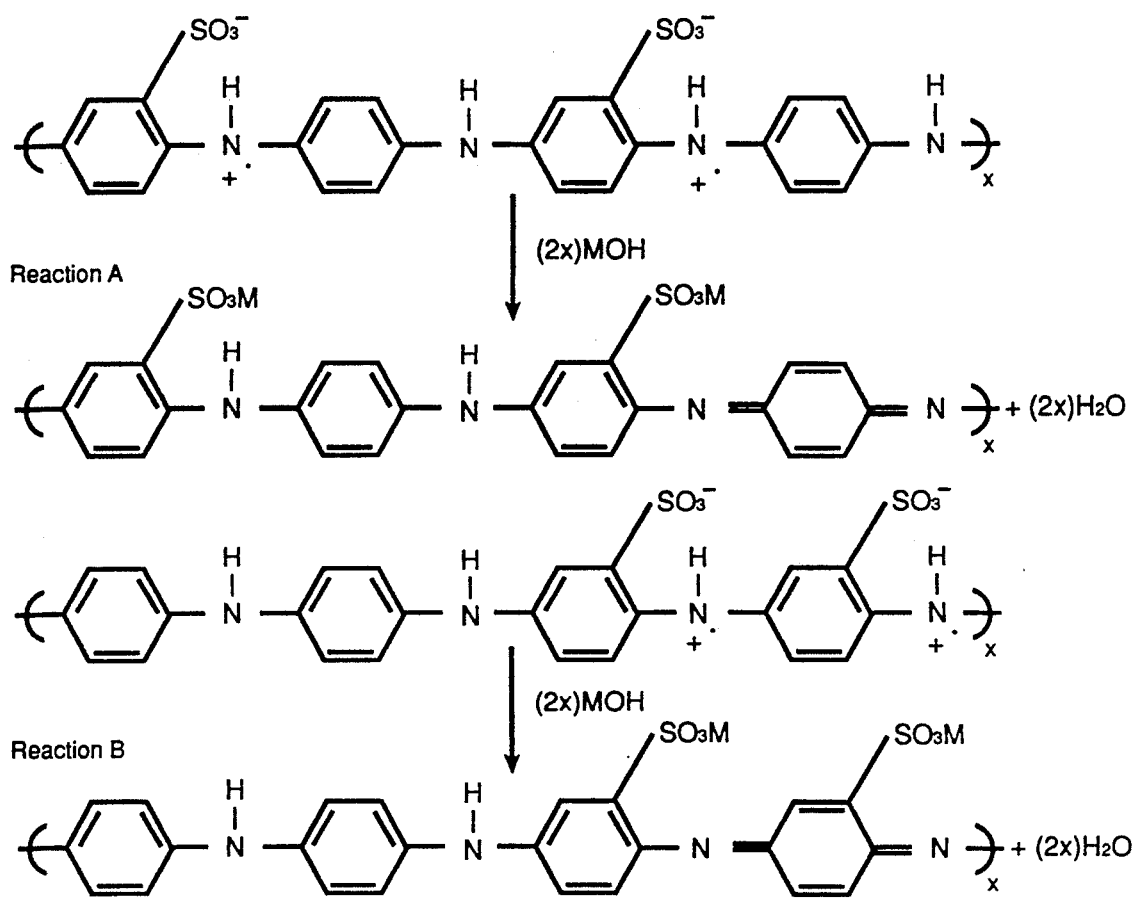
FIG. 3 is a schematic illustration of the equilibrium between self-doped sulfonated polyaniline and its base form in aqueous $NH_4OH$ solution.

The solubility of the compound I also differs markedly from that of the corresponding polyaniline polymer. The compound I dissolves completely in aqueous 0.1M $NH_4OH$ or NaOH to give a blue-violet solution while polyaniline washed with such solvent converts to the insoluble base form. The compound I partially dissolves in NMP (N-methyl pyrrolidinone) to form a blue color solution and as well as DMSO (dimethyl sulfoxide) to show green color. Treatment of the self-doped polyaniline, compound I, with an aqueous base proceeds consequently to the deprotonation of the backbone of the polymer to form the structure corresponding to emeraldine base, as shown in the reaction A or reaction B depicted in FIG. 3.

The deprotonation results in a 5 to 10 order of magnitude decrease in conductivity. Compound I differs from emeraldine hydrochloride in that it is soluble in aqueous 0.1M $NH_4OH$ and NaOH.

Figure 4:
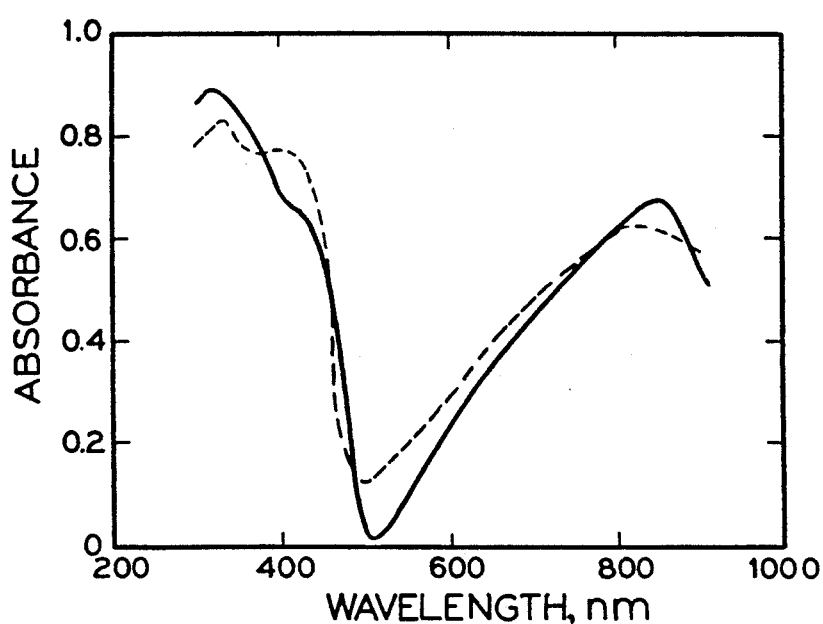
FIG. 4 is a graph illustrating the electronic absorption spectra of (a)—sulfonated polyaniline film cast from an aqueous $NH_4OH$ solution in a quartz substrate, then dried in air, (b)—emeraldine salt film.

Comparisons of the electronic absorption spectra of the compound I and emeraldine base provide insight into changes in the molecular geometry caused by the sulfonic group-substitution on the polyaniline backbone. Steric effects are considered in the interpretation of the electronic absorption spectra of the sulfonated polyaniline. In order to compare the feature of the electronic spectra of the self-doped polymer (compound I) and emeraldine hydrochloride, their spectra are given in FIG. 4. The high energy absorption band at 320 nm (3.88 eV) and 326 nm (3.81 eV) for compound I and emeraldine hydrochloride, respectively, is assigned to the pi-pi* transition based on earlier experimental and theoretical studies. The other two absorption bands at 435 nm (2.88 eV) and 850 nm (1.46 eV) for the compound I, 413 nm (3.00 eV) and 826 nm (1.50 eV) for emeraldine hydrochloride, have been assigned to the optical absorption of the metallic polaron band of the salt form. The hypsochromic shift of the pi-pi* transition in going from emeraldine hydrochloride to compound I is again in accord with decreased extent of conjugation caused by increased phenyl ring torsion angle which results from steric repulsion between the $-SO_3^-$ groups and hydrogens on the adjacent phenyl rings. The bathochromic shift of the polaron band transition is also in agreement with relative energy band shifts expected for increased ring torsion angles.

Cyclic voltammetry studies were carried out using a Hokto Corporation (HC) Model HA-301 potentiostat/galvanostat with HC HC-201 digital coulometer. The HC HB-111 universal programmer was used for the generation of the sweep signals which were fed into the HA-301. Voltammograms were recorded on a Hewlett-Packard Model 7046B XYY' recorder with an optional time base function. For the studies of current peak changing with the sweep rate, a Nicolet Model 370 digital oscilloscope with digitizer and disk-drive plug-in was used for recording $i_p$ in the high frequency characterization experiments. A standard three electrode system was enclosed in a dual compartment cell with a fine porosity glass frit separating the working electrode and reference electrode from the counter electrode. Platinum disks (1.0 cm$^2$) were used as working and counter electrodes. A Ag/AgCl, saturated KCl electrode encased with a luggin probe was used as a reference electrode. 1.0M HCl (20 ml) was used as the electrolyte. All studies, except scan rate dependence of current peak, were performed at a sweep rate of 50 mV/s. Since preliminary observations indicated that air did not have any effect on the cyclic voltammograms, all operations were carried out in the presence of air.

The compound I (FIG. 1) was cast on a Pt electrode by evaporating a solution of the polymer in 0.1M ammonium hydroxide and subsequently dried in air. In order to obtain reproducible cyclic voltammograms the electrode was preconditioned by cycling between $-0.2$ and 0.4 volts vs Ag/AgCl for about 10 minutes (25 cycles).

Figure 5:
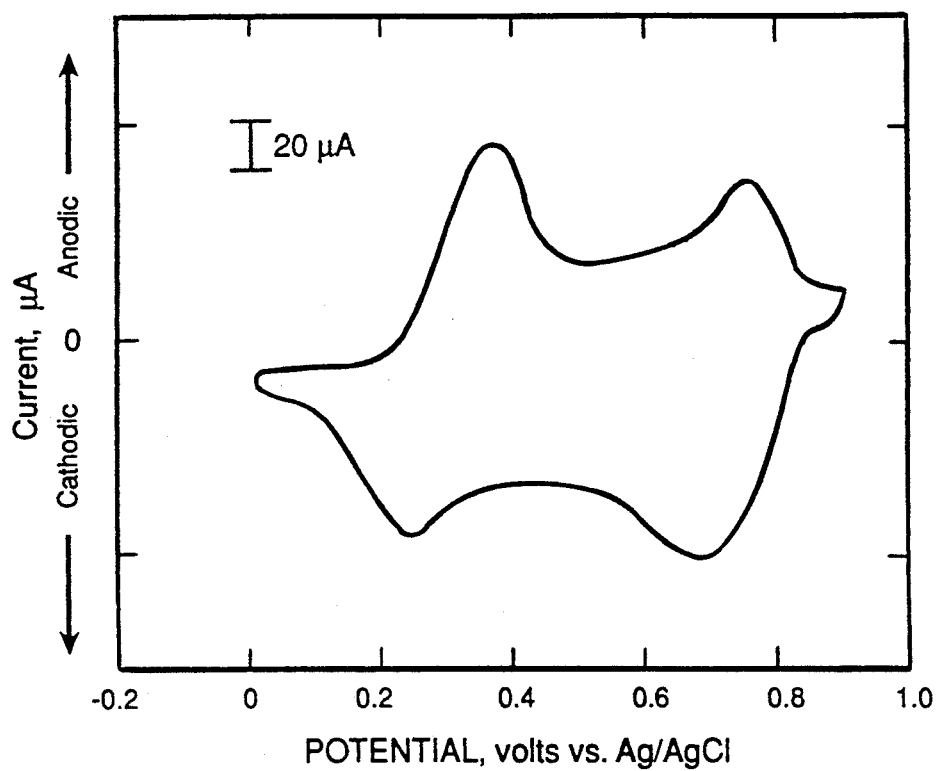
FIG. 5 is a graph illustrating the cyclic voltammograms (50 mV/s) of—sulfonated polyaniline in 1M HCl.

The color of a sulfonated polyaniline film on Pt electrode in 1M HCl electrolyte was changed by varying the applied potential. These color changes were similar to those of polyaniline under the same conditions. When the potential was scanned between $-0.2$ to 0.5 V vs Ag/AgCl a pair of redox peaks were found for sulfonated polyaniline electrode as seen in FIG. 5. The polymer was initially transparent yellow at $-0.2$ V (reduced state) and changed to a green color at 0.5 V. The earlier studies of polyaniline showed that repeated potential cycling between $-0.2$ and 0.5 V vs SCE in 1M ZnCl+0.5M (NH$_4$)Cl could be performed without causing degradation of the polymer. In a potential scan range between $-0.2$ and 0.6 V vs SCE in 1M HCl polyaniline film is fairly stable and the shape of the voltammograms changed little during $5 \times 10^3$ cycles. A similar stability was observed for sulfonated polyaniline, the voltammograms of film in 1M HCl remained almost the same after 48 hr. scan in the range of $-0.2$ and 0.6 V with the scan rate 50 mV/s (approximately 5,000 cycles). The typical cyclic voltammograms of sulfonated polyaniline polymer films in 1M HCl exhibited a sharp anodic peak at 0.35 V with $\Delta E_{p/2}$ approximately 0.10 V and a broad cathodic peak at 0.24 V with $\Delta E_{p/2} \sim 0.14$ V.

When sulfonated polyaniline film was scanned between a potential $-0.2$ to 0.9 V in 1M HCl, as seen in FIG. 5, two distinct pairs of redox peaks are found. The second anodic peak is at 0.75 V for sulfonated polyaniline, which is similar to that of parent polyaniline (0.78 V vs Ag/AgCl). The implication of the high value of the first oxidation wave (0.35 V) of the sulfonated polyaniline compound to that of polyaniline (0.2 V) is that the leucoemeraldine form of sulfonated polyaniline is more oxidatively stable than its parent polyaniline. The cyclic voltammogram behavior of sulfonated polyaniline in 1M HCl electrolyte showed good stability in air. However, once the potential was higher than 0.8 V a third anodic peak appeared between two previous peaks. This is due to the degradation of the sulfonated polyaniline polymer. In the high potential region the polymer degraded in the aqueous solution of HCl forming p-benzoquinone or hydroquinone by hydrolysis of overoxidized polymers. The rate of degradation was strongly dependent on the applied potentials.

The scan rate dependence of the current peak of polymer film indicates that the electron transfer through the film is fast. The first anodic peak current shown in FIG. 5 exhibits a linear relationship with a scan rate v. Redox reactions are faster than polyaniline due to the sulfonic group on phenyl rings. For polyaniline there are no counterions in the backbone of neutral polymer. During electrochemically cycling between two different oxidation states (i.e., doping and dedoping), the counterions must migrate into the polymer during doping process and diffuse out of polymer in dedoping process in order to compensate the charge. This solid-state diffusion process is often the rate limiting step in the kinetics. However, because of $-SO_3H$ group in the backbones of the sulfonated polyaniline polymer, when positive charge is introduced into the pi-electron system (doping or oxidizing), the system can be compensated by proton migrating out of the polymer from the $-SO_3H$ group leaving the negative charged counterions behind the backbones of the polymer. This is illustrated in the scheme as shown in FIG. 6, (1), (2).

Figure 6:
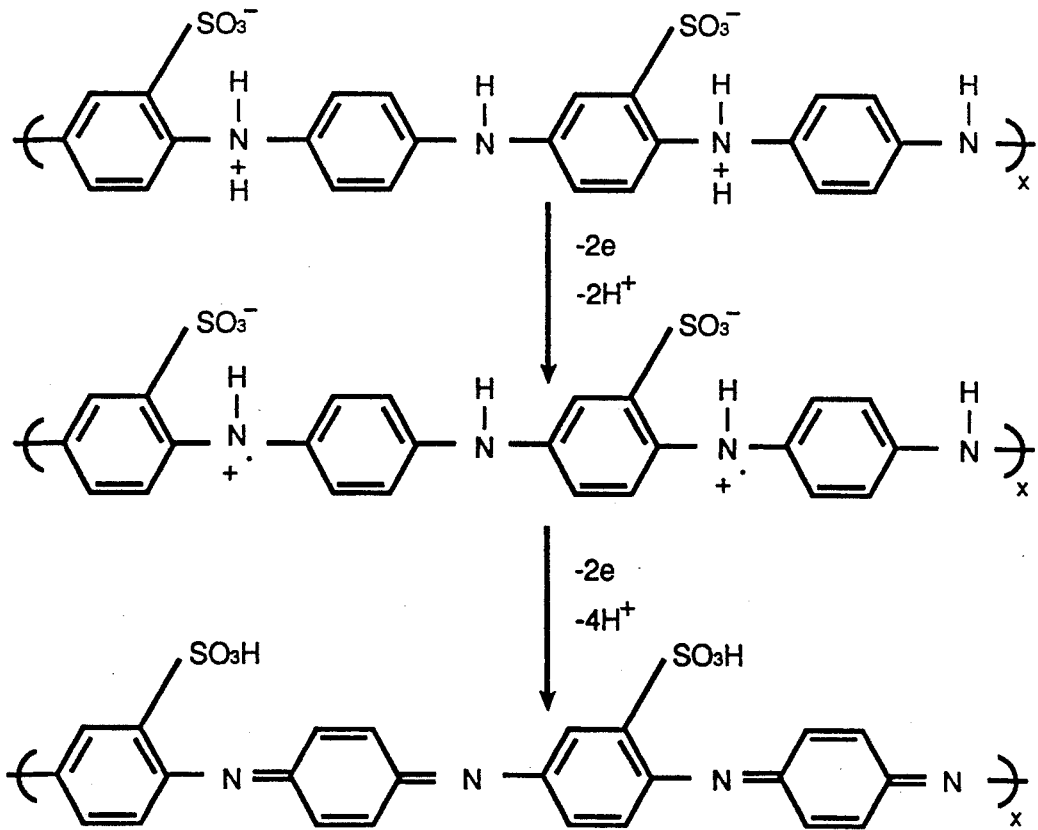
FIG. 6 is a schematic illustration of the redox process of the sulfonated polyaniline during sweeping the potential from $-0.2 \sim 1.0$ v vs Ag/AgCl.

As seen in FIG. 6, from (1) to (2) H$^+$ migrated out of polymer instead of Cl$^-$ diffused into the polymer. Since the proton is the smallest ion with the highest mobility, the sulfonated polyaniline is expected to have a faster kinetic process than that of polyaniline.

The present invention further relates to the uses of the ammonia and substituted ammonia salts of sulfonated polyaniline compositions and their derivatives in electronic, electrochemical, chemical, and optical applications. The sulfonated polyaniline compositions have a more rapid electrochemical response than polyaniline. The ability of the sulfonated polyaniline compositions to have a fast switching speed between a conducting and a nonconducting state with good reversibility makes such compositions attractive polymers to use for a variety of electrochemical applications.

Applications contemplated by the present invention include, but are not limited to, the use of sulfonated polyaniline compositions for electrochromic displays where the composition's rapid response to a voltage step allows for a rapid change in color. Another application involves the use of sulfonated polyaniline compositions in active electronic devices such as switches and transistors. The sulfonated polyaniline compositions are also useful as chemical sensors, wherein exposure to bases, acids, water and the like reactive chemicals causes a change in color of the composition and a change in the conductivity of the composition.

The sulfonated polyaniline compositions can be coated by a variety of techniques onto substrates of choice. The sulfonated polyaniline polymers can be applied to substrates according to the present invention by spray coating, dip coating, spin casting, transfer roll coating, brush-on coating, and the like. The sulfonated polyaniline polymers can also be electrochemically deposited onto conductive substrates by known electrochemical deposition techniques.

Sulfonated polyaniline can also be entrained within a matrix of, or copolymerized with insulating polymer materials to thereby produce a blend or a composite. In addition, derivatization of the sulfonated polyaniline compositions can enhance compatibility and processability of the polymer with other polymers.

The sulfonated polyaniline compositions and derivatives thereof have, or can be designed to have, desired processability in terms of, for example, viscosity, flexural strengths, solubility, adhesion to substrates, cross-linking, melting point, weight, adaptability to filler loading and the like. This is achieved by varying as desired the degree of self-protonation, the state of oxidation, and the type and degree of substituents on the polymer. Certain substituents may be preferred for the facilitation of desired processing parameters, such as increasing or decreasing solubility, altering extrusion parameters (rheology), achieving a specific viscosity, and the like. Derivatization is also useful for achieving compatibility with a copolymer, facilitating the tunability of the sulfonated polyaniline composition for non-linear optics applications, and for specific wavelength absorption, such as microwave attenuation or a particular photoresponse.

Salts of sulfonated polyaniline compositions are useful as an interim material in the making of self-protonated sulfonated polyaniline compositions. The sulfonated polyaniline salt compositions are very soluble in water, while the sulfonated polyaniline compositions are only modestly soluble in water. For example, the sulfonated polyaniline salt compositions can be dissolved in water at very high densities and can be very uniformly applied to a substrate. After application to the substrate the insulating sulfonated polyaniline salt composition can be converted to the conducting sulfonated polyaniline composition. In the case where the counterion is, for example, $NH_4^+$, the $NH_3$ gas can be evaporated off.

In addition, the sulfonated polyaniline compositions can be dissolved in a solvent, cast as thin films from the solvent solution, and the solvent evaporated to produce free standing films. The solubility of the sulfonated polyaniline compositions in a variety of solvents provides a novel method for processing such sulfonated polyaniline compositions for a variety of applications. A solution of the sulfonated polyaniline (SPAN) composition in $NH_4OH$ can be applied to a substrate or any object desired to be cast or coated with the sulfonated polyaniline composition. The sulfonated polyaniline-ammonium hydroxide (SPAN-$NH_4OH$) solution can be applied in any known manner for forming an initial film or coating on a substrate. The initial film or coating on the substrate is an interim material, namely, the $NH_4^+SPAN^-$ salt, such that the backbone polymer is in the insulating emeraldine base form.

The initial film or coating of the interim $NH_4^+SPAN^-$ salt material can be permanently affixed to the substrate, or alternatively, can be cast as a film onto a substrate, such as a Teflon ® coated or glass substrate, whereby the cast film can be readily removed from the substrate.

After the interim salt material is applied to the substrate, the $NH_4^+$ dissociates to form $NH_3$ and $H^+$. The $NH_3$ leaves the polymer as a gas and the $H^+$ protonates the imine sites to form the shiny green self-protonated conducting form of the sulfonated polyaniline composition. The chemistry involved in this process is visualized as structure IIc of FIG. 1 going to structure Ia of FIG. 1 with the concomitant release of $NH_3$ gas. The rate of $NH_4$ dissociation increases at elevated temperatures and decreases at reduced temperatures such that the process can be readily controlled. It is contemplated that the temperature range can vary from about $-20°$ C. to about $50°$ C. for unsubstituted ammonia.

One example of a method of casting or coating a sulfonated polyaniline composition on a substrate involves dissolving 0.5 g SPAN in 20 ml of 0.1M $NH_4OH$ at about room temperature. It should be noted that more SPAN can be dissolved if the molarity of $NH_4OH$ is increased. The SPAN-$NH_4OH$ solution is transferred into a container having a fine porosity glass frit bottom. The substrate or object to be coated with SPAN is placed under the container. Due to gravity, the solution drips onto the substrate and excess solution overwhelms the substrate, forming the initial film or coating. Subsequently, the water and then $NH_3$ gas are removed from the initial film or coating such that the shiny, green conducting form of SPAN is homogeneously formed on the substrate.

Various examples illustrating the use of the speed and reversibility of the electrochemical responses of the sulfonated polyaniline compositions and the ammonia (both unsubstituted and substituted) salts thereof are given below. It should be understood that these examples are not limiting and that the sulfonated polyaniline salt compositions and ammonia salts thereof can also be used in other such applications as are known to those skilled in the art, including but not limited to the further examples given in the parent co-pending application and in the co-pending application Ser. No. 07/426,959 filed Oct. 24, 1989 now U.S. Pat. No. 5,164,465.

EXAMPLE 1

The present invention relates to the use of the insulating ammonium salt form of the polymer as $NH_3$ filters. As shown in FIG. 8, the SPAN film can be used as an $NH_3$ filter due to the fact that the SPAN film is a good transporting medium for $NH_3$ and is a poor transporting medium for other gases. Such filters can be used in $NH_3$ production and also used in situations where it is desirable to pass $NH_3$ through a material.

EXAMPLE 2

Temperature controlled visual (optical) switches and temperature controlled conductivity switches can be produced using the present invention.

Referring now to FIGS. 9a, 9b and 10, for example, a closed, light transmissive temperature sensitive environment comprised of, for example, glass, quartz or plexiglass contains the insulating ammonium salt of the sulfonated polymer, $NH_4^+SPAN^-$. As the temperature surrounding the closed, temperature sensitive environment increases, the rate of $NH_4^+$ dissociation into $NH_3$ gas and H+ protonation of the polymer backbone increases, and the insulating ammonium salt of the polymer changes from blue to the shiny, green self-doped conducting form of the polymer. Thus, at room temperature the $NH_3$ evolves off leaving the conducting sulfonated polyaniline. As the temperature decreases or the environment cools the polymer is changed into the insulating ammonium salt of sulfonated polyaniline.

As shown in FIG. 10, a window of conductivity is shown as the temperature changes from high to low. The exact temperature ranges at which the insulating salt of the sulfonated polyaniline changes to the conducting sulfonated polyaniline can be varied by the use of a substituted ammonium salt.

Figure 11:
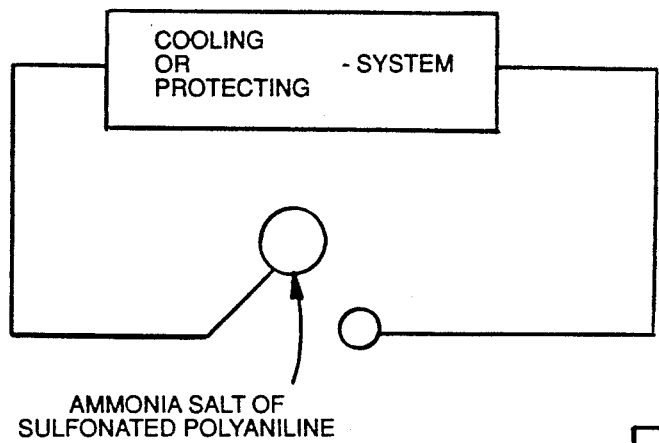
FIG. 11 shows that the polyaniline composition can be operatively connected to a switching mechanism whereby the conductivity of the self-doped conducting polyaniline composition can be deleted. The temperature controlled electric switch can be used in protecting or operating systems.

Referring now to FIG. 11, the polyaniline composition can be operatively connected to a switching mechanism whereby the conductivity of the self-doped conducting polyaniline composition can be detected. The temperature controlled electric switch can be used in protecting or operating systems. At low temperatures the ammonium salt of the sulfonated polyaniline composition is an insulator. As the temperature increases the ammonia evolves off and the ammonium salt changes to the conducting sulfonated polyaniline composition thus turning the cooling or protecting system on.

In addition, the ammonia salts of the sulfonated polyaniline composition can be used as a temperature controlled indicator either in a reversible manner, as described above or as a register for a permanent temperature change wherein the ammonia salt of the sulfonated polyaniline composition is in an open environment such that the change in temperature causes the $NH_3$ gas to evolve off. Such temperature indicators have a wide variety of applications, such as for use in determining exposure of perishable goods to elevated temperatures and thus, the determination of possible spoilage of such perishable goods.

In addition, the ammonium salt of sulfonated polyaniline can have an over wrap material which is semipermeable to $NH_3$ such that the evolution of $NH_3$ from the ammonium salt can be controlled. For example, drugs, foods, or biological products which can be exposed to air for certain finite amounts of time can have such indicators. The finite amount of time can be varied from less than an hour to the passage of days.

Figure 12:
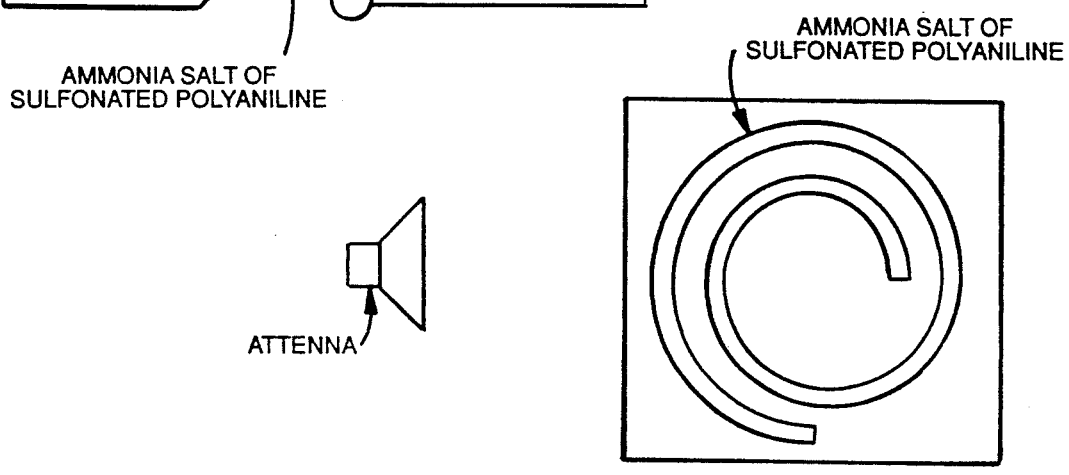
FIG. 12 is a diagram which shows a strip of the ammonia salt of the sulfonated polyaniline composition as a temperature control indicator used to tag and identify items when the ammonia salt is exposed to an environment having a temperature change. The ammonia salt becomes conducting as the temperature increases and the ammonia evolves off and the sulfonated polyaniline composition is detected by a receiving antenna.

In addition, the temperature control indicator can be used to tag and identify items as shown in the diagram of FIG. 12. A strip of the ammonia salt of the sulfonated polyaniline composition is exposed to a environment having a temperature change. The ammonia salt becomes conducting as the temperature increases and the ammonia evolves off. Thus, when the item tagged with such strip passes by a receiving antenna the conducting form of the sulfonated polyaniline composition is detected. It can readily be determined whether the item tagged, whether foods, drugs or biological items which must remain at low temperatures, have been exposed to damage causing elevated temperatures.

EXAMPLE 3

The present invention also relates to the use of insulating ammonia salts of the sulfonated polyaniline composition as ammonia or substituted ammonia sensors.

The presence of the ammonia or substituted ammonia can be measured by changes in conductivity from the insulating ammonia salt form to the conducting sulfonated polyaniline composition. In addition, the concentration of the ammonia can be measured by a change in light absorbance (i.e., a visual or optical change in the color from the blue ammonia salt to the green conducting sulfonated polyaniline composition).

Figure 13:
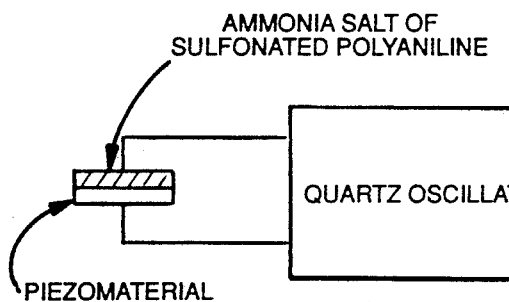
FIG. 13 shows how the concentration of ammonia can be measured by weight gain wherein a quartz oscillator comprising a piezomaterial and sulfonated polyaniline composition are exposed to ammonia.

Further, as shown in FIG. 13, the concentration of ammonia can be measured by weight gain wherein a quartz oscillator comprising a piezomaterial and sulfonated polyaniline composition are exposed to ammonia. The sulfonated polyaniline composition absorbs the ammonia and a gain in weight is registered; i.e., $\Delta m/mo \sim \Delta f/fo$.

In addition, the concentration of ammonia can be measured by measuing the response time at fixed conductivities, absorption of light, optical spectra change from blue to green, or a change in the capacitance. The quicker the response time, the greater the presence of ammonia.

Figure 14:
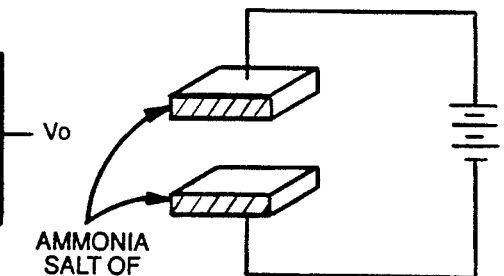
FIG. 14 shows that the concentration of ammonia can also be measured by detecting a change in the capacitance.

The concentration of ammonia can also be measured by detecting a change in the capacitance as shown in FIG. 14. As the sulfonated polyaniline composition absorbs ammonia, the surfaces become insulating first and the capacitance itself is a measurement of the concentration of ammonia going past the sulfonated polyaniline composition.

Further, the ammonia sensors can be used in monitoring levels or concentrations of ammonia in such uses as in ammonia salt production of, for example $NH_4NO_3$, $NH_4Cl$, $(NH_4)_2SO_4$, etc. Ammonia sensors can also be used to test concentration of ammonia in fertilizer production, or the detection of $NH_3$ in plants or biological facilities.

EXAMPLE 4

Figure 15:
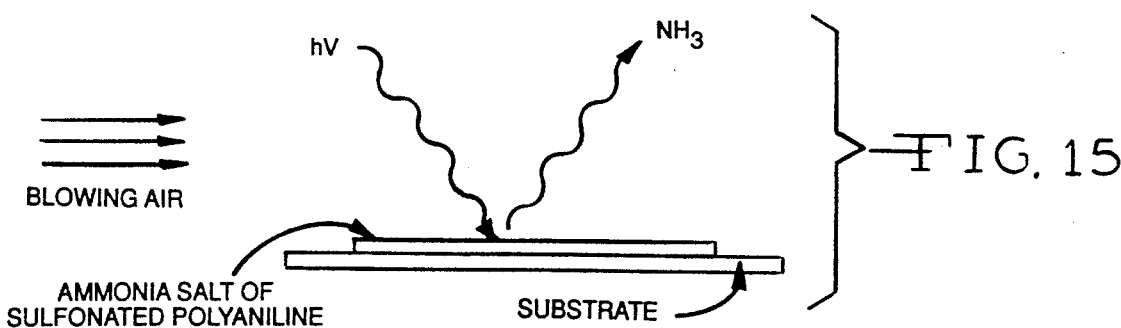
FIG. 15 shows that the ammonia salts of sulfonated polyaniline compositions can also be used for capacitance memory devices for the storage and retrieval of information.

The ammonia salts of sulfonated polyaniline compositions can also be used for capacitance memory devices for the storage and retrieval of information, as shown in FIG. 15. A thin film less than approximately 1000A of an ammonia salt is formed on a substrate as part of an information storage unit. The film is patternwise exposed to a writing beam representative of the information. The writing beam or absorbing light has a known photon frequency and intensity which heats the ammonia salt film causing the evolution of the unsubstituted or substituted ammonia from the film. The evolved ammonia is removed from the storage unit by, for example, moving air across the surface of the film, thus leaving a "permanent" record of laser or light writing on the storage unit. The record is then read by a reading beam having a second known photon frequency and intensity predetermined to match the altered optical absorption spectrum or conductivity of the exposed ammonium salt film, whereby the information is retrieved from the altered film. Alternatively, the information can be read by probing the conductivity of the individual bits by, for example, capacitative or resistive probing. The bits with information inscribed by desorption of ammonia or substituted ammonia will have higher conductivity. The storage unit record is thus read by probing color or conductivity changes in the altered film. The information stored by the writing beam can be erased by exposing the altered film to unsubstituted or substituted ammonia. The stable temperature ranges at which the storage and information unit operates can be shifted by using various substituted ammonia.

While the invention has been disclosed in this patent application by reference to the details of preferred embodiments and examples of the invention, it is to be understood that this disclosure is intended in an illustra-

TABLE 1

Elemental Analyses[a] of Chemically Synthesized Sulfonic Ring-Substituted Polyaniline

| sample | C | H | N | S | O[b] | Total | Formula |
|---|---|---|---|---|---|---|---|
| PAN[c] (cal.) | 79.54 | 5.00 | 15.46 | — | — | 100 | $C_{12}H_9N$ |
| PAN (found) | 79.14 | 4.96 | 15.16 | — | — | 99.26 | |
| SPAN[c] (cal.) | 51.67 | 3.96 | 10.04 | 11.49 | 22.84 | 100.00 | $C_{12}H_9N_2SO_3(H_2O)_{0.98}$ |
| SPAN (found) | 52.12 | 3.98 | 10.13 | 11.18 | 22.59 | 100.00 | |

[a]C, H, and N analyses were performed by Dr. R. Kohli at U. of Pennsylvania, S analysis was carried out by M-H-W Laboratories, Phoenix, AZ.
[b]Oxygen content is by difference.
[c]PAN refers to polyaniline and SPAN to ring-sulfonated polyaniline.

We claim:

1. A method for making a self-protonated, conducting sulfonated polyaniline composition of formula I:

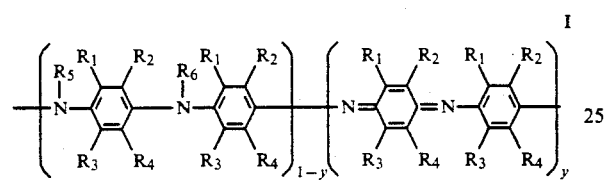

wherein $0 \leq y \leq 1$, $R_1$, $R_2$, $R_3$, $R_4$, $R_5$ and $R_6$ are independently selected from the group consisting of H, —$SO_3M$, —$R_7SO_3M$, —$OCH_3$, —$CH_3$, —$C_2H_5$, —F, —Cl, —Br, —I, —$(NR_7)_2$, —$NHCOR_7$, —OH, —$O^-$, —$SR_7$, —$OR_7$, —$OCOR_7$, —$NO_2$, —COOH, —$COOR_7$, —$COR_7$, —CHO and —CH, wherein $R_7$ is a $C_1$-$C_8$ alkyl, aryl or aralkyl group, wherein the fraction of rings containing at least one $R_1$, $R_2$, $R_3$ or $R_4$ group being an —$SO_3M$, or —$R_7SO_3M$ wherein M is an unsubstituted or substituted ammonia of the formula $NA_1A_2A_3$ and $A_1$, $A_2$ and $A_3$ are independently selected from the group consisting of H, and $C_1$-$C_8$ straight or branched alkyl, varies from approximately 20 percent to 100 percent; comprising:

(a) dissolving a sulfonated polyaniline composition in an unsubstituted or substituted ammonium hydroxide to form a solution comprising an unsubstituted or substituted ammonium salt of the sulfonated polyaniline composition;

(b) exposing a substrate to the solution comprising the ammonium salt of the sulfonated polyaniline composition; and, (c) converting the ammonium salt of the sulfonated polyaniline composition to the self-protonated conducting sulfonated polyaniline composition by removing water and the unsubstituted or substituted ammonia gas.

2. The method of claim 1 in which the removal of water and the unsubstituted or substituted ammonia is conducted at a temperature in the range of about 20° C. to about 50° C.

3. The method of claim 1 in which the removal of water and the unsubstituted or substituted ammonia is conducted at about room temperature.

* * * * *